United States Patent
Naito

[11] Patent Number: 5,808,448
[45] Date of Patent: Sep. 15, 1998

[54] METHOD AND APPARTUS FOR OPERATING AN ELECTRIC VEHICLE HAVING A HYBRID BATTERY

[75] Inventor: Shotaro Naito, Hitahinaka, Japan

[73] Assignee: Hitachi, Ltd., Japan

[21] Appl. No.: 565,096

[22] Filed: Nov. 30, 1995

[30] Foreign Application Priority Data

Nov. 30, 1994 [JP] Japan ................................ 6-297329

[51] Int. Cl.$^6$ ........................................... H02P 7/00
[52] U.S. Cl. ........................... 322/13; 322/28; 322/16; 320/101
[58] Field of Search ........................... 322/13, 14, 15, 322/16, 28; 320/5, 6, 9, 10

[56] References Cited

U.S. PATENT DOCUMENTS

| | | | |
|---|---|---|---|
| 4,081,693 | 3/1978 | Stone | 307/66 |
| 4,962,462 | 10/1990 | Fekete | 364/492 |
| 5,631,532 | 5/1997 | Azuma et al. | 320/5 |
| 5,650,713 | 7/1997 | Takeuchi et al. | 322/16 |

FOREIGN PATENT DOCUMENTS

47-32321  11/1972  Japan .
6-124720   5/1994  Japan .

*Primary Examiner*—Steven L. Stephan
*Assistant Examiner*—Nicholas Ponomarenko
*Attorney, Agent, or Firm*—Evenson, McKeown, Edwards & Lenahan, P.L.L.C.

[57] ABSTRACT

The invention provides driving method and apparatus for an electric vehicle having a motor for driving the vehicle, a dc electric power source, a control device including a signal generating means for generating a signal to control rotation of the motor, and a key switch for controlling OFF-ON operation of the motor. The dc electric source includes a power battery (storage battery) connected to the motor and an energy battery (a fuel cell) connected in parallel with the power battery through an energy battery control switch. A battery current/voltage control unit controls the energy battery control switch based on the current or the voltage of the power battery, the energy battery or the motor, to maintain the voltage of the dc electric power source within a given range. A charging unit charges the power battery form the energy battery when the key switch is turned off, if the charge level of the power battery is below a given value, and stops charging if the charge level is above a given value.

7 Claims, 9 Drawing Sheets

METHOD AND APPARTUS FOR OPERATING AN ELECTRIC VEHICLE HAVING A HYBRID BATTERY

BACKGROUND OF THE INVENTION

The present invention relates to a method and apparatus for operating an electric vehicle driven by a motor having a hybrid battery as an electric power source.

In general, an electric vehicle comprises an inverter for converting the output of a direct current electric power source into a variable voltage and variable frequency alternating current, a three-phase ac motor, a current sensor and a speed sensor for detecting the current and the rotating speed of the three-phase ac motor, a torque command calculating means for determine a torque command of the three-phase ac motor corresponding to an accelerator opening, a three-phase ac command generating means for generating a three-phase alternating current command to control current of the three-phase alternating current motor based on the torque command and the output of the current sensor, and a signal generating means for generating a signal to control the inverter based on the three-phase alternating current command and the current flowing the three-phase alternating current motor.

Such vehicles have become widely used because they are clean, do not exhaust harmful substances, and can harmonize with the global environment. Development trends for new cells are presented in an article entitled "Development trends of cells for electric vehicles", Chemical Industry, December, 1992, pages 69 to 74, published by Kagaku-Kougyo Sha.

Although storage batteries, especially lead batteries are commonly used in such vehicles, their travel distance per charge is short, which is an obstacle to the wide use of electric vehicles.

On the other hand, fuel cells used at ordinary temperature, such as solid polymeric fuel cells have lately attracted considerable attention as an alternative to storage batteries for powering electric vehicles. Fuel cells extract energy by electro-chemically reacting hydrogen with oxygen, and are capable of operating for a long time since power is continuously output as long as fuel is supplied. Further, the exhaust is clean. However, the conventional ordinary temperature fuel cell has a disadvantage in that the output power is 1 V per unit cell or only about 1 W/cm$^2$, which is too small to power a vehicle which requires a wide range of output power, from a low load to a high load.

Hubrid battery technologies are disclosed in Japanese Patent Application Laid-Open No.47-32321 (1972) and Japanese Patent Application Laid-Open No.6-124720 (1994). In these arrangements, when current flowing in a motor is large, both a fuel cell and a storage battery are used. When the current flowing in the motor is small, surplus electric power of the fuel cell is used to charge the storage battery to support the next large load.

The above conventional hybrid electric power source is capable of responding to a wide range of output power requirements by supporting the weak points of the storage battery and the fuel cell as batteries for a vehicle. However, an electric vehicle having such a conventional hybrid electric power source is inferior to a gasoline powered vehicle in driving characteristics, traveling distance, size and cost.

SUMMARY OF THE INVENTION

An object of the present invention is to provide a driving system for a vehicle capable of responding to a wide range of output power requirements, and driving a long travel distance, by combining a storage battery and a fuel cell in an optimum usage pattern, taking full advantage of both the fuel cell and the storage battery under various operating conditions.

Another object of the present invention is to provide a vehicle driving system having a hybrid electric power source which is reduced in the size and cost.

These and other objects and advantages are achieved by the present invention which provides an electric vehicle propulsion system comprising an ac motor for driving the vehicle, a dc electric power source, a control device including a signal generating unit for generating a signal to control rotation of the motor, and a key switch. The dc electric source includes a power battery (a storage battery) connected to the motor through an inverter and an energy battery (a fuel cell) connected in parallel with the power battery through an energy battery control switch. The driving system comprises a battery current/voltage control unit for controlling the energy battery control switch based on the current or the voltage of the power battery, the energy battery or the motor, to maintain the voltage of the dc electric power source within a given range. A charging unit charges the power battery from the energy battery when the key switch is off if the charge level of the power battery is below a given value, and stops charging if the charge is above the given value.

According to another characteristic of the present invention, the voltage of the energy battery is higher than the voltage of the power battery.

According to a further characteristic of the present invention, the energy battery has drive pumps to supply it with fuel and recirculate water, and the power battery provides electric power to the drive pumps at starting operation.

According to a still further characteristic of the present invention, the vehicle has auxiliary machines including an air conditioner motor, a motor for power steering and a vacuum motor, which are driven by the energy battery.

According to the present invention, the current and/or the voltage of any two of the power battery, the energy battery and the motor connected in parallel are detected and controlled by a battery current/voltage control unit to maintain the voltage of the dc electric power source within a given range. The power battery is charged from the energy battery when the key switch is off if the charge level of the power battery is below a given value, and the charging is stopped if the charge is above the given value.

When the electric vehicle is driven in a low load state, the electric power required for driving the motor is mainly supplied from the energy battery. When the load of the electric vehicle increases and greater power is required, electric power is supplied mainly from the power battery to the three-phase alternating current motor.

Further, it is possible to drive the electric vehicle for a long time, while accommodating a demand for wide range of output power characteristics, from a low load to a high load, by charging the power battery with the electric power supplied from the energy battery, which always generates a constant output power. The electric power of the power battery is used to drive the vehicle when fluctuation of the load is large, while the electric power of the energy battery, which is capable of sustaining a constant output for a long time, is used to drive the auxiliary machines in which fluctuation of the load is small. In this manner, the possible travel distance can be extended and the size of the electric power system can be reduced. Further, the electric power system can respond to a wide range of output power demands, from a low load to a high load, and the driving characteristics can be improved.

Other objects, advantages and novel features of the present invention will become apparent from the following detailed description of the invention when considered in conjunction with the accompanying drawings.

DETAILED DESCRIPTION OF THE PREFERRED EMBODIMENTS

An embodiment of the present invention will be described below referring to the block diagram in FIG. 1, which shows a main electric power source of on an electric vehicle that includes a dc electric source composed of an energy battery 1 and a power battery 2 connected in parallel. A fuel cell, which generates a constant output power, is used as the energy battery 1, and a lead storage battery is used as the power battery 2. An auxiliary battery 3 supplies electric power to a controller 10. An energy battery current/voltage detector 4 detects the current and the voltage of the energy battery, while a power battery current/voltage detector 5 detects the current and the voltage of the power battery. A relay 6 is provided for the energy battery, and an energy battery control switch 7 for control current and voltage is connected between the energy battery 1 and the power battery 2. A main contactor 12 switches the main circuit.

An inverter 13 converts the dc electric power of the batteries 1 and 2 into alternating current electric power using conventional power switching elements, and a three-phase ac motor 14 drives the electric vehicle (not shown). A key switch 15 is connected between the auxiliary battery 3 and the controller 10. A speed sensor 16 detects rotating speed N of the motor 14, while current sensors 17a, 17b, 17c detect three-phase alternating primary currents i (iu, iv, iw) flowing in the primary windings of the alternating current motor 14. An accelerator switch 18 outputs a signal θA corresponding to the degree of depression of an accelerator pedal. A pump 19 supplies fuel to, and extracts reaction products from, the energy battery 1.

The controller 10 comprises a rotating speed detecting unit 20, a primary frequency command generator 22, a torque command calculator 30, an accelerator opening calculator 31, a vector control calculator 32, an alternating current command generator 33, a current/voltage controller 40, a PWM signal generator 42 and a battery current/voltage controller 44.

The controller 10 receives the rotating speed N, the motor current i and the accelerator opening θA. The torque command calculator 30 calculates a torque command Tr, and the primary frequency command generator 22 calculates a primary angular frequency $\omega_1^*$. Based on the torque command Tr, the vector control calculator 32 calculates an alternating current command $I_1$. Using the primary angular frequency $\omega^{1*}$ and the alternating current command $I_1$, the controller 10 performs current control calculation and alternating current command calculation in the current/voltage controller 40 and the alternating current command generator 33, and outputs a PWM signal from the PWM signal generator 42. The inverter 13 generates a variable frequency, variable amplitude three-phase ac voltage from the dc voltage output by the batteries 1 and 2, based on the PWM signal, to control the torque of the three-phase alternating motor 14.

The rotating angular speed detector 20 detects a rotating angular speed ωr ($\omega = 2\pi \cdot N/60$) of the ac motor 14 from the A-phase and B-phase pulses of the output N of the speed sensor 16. The torque command calculator 30 receives a signal corresponding to the depression angle θA of accelerator pedal 18 obtained in the accelerator opening calculator 31, and the rotating angular speed ωr of the ac motor obtained in the rotating angular speed detector 20, and generates a torque command Ir indicative of a desired torque output of the three-phase ac motor 14.

The vector control calculator 32 receives an excitation motor current command im and a motor torque τM and generates a torque current command It*. The alternating current command generator 33 generates a command i* (iu*, iv*, iw*) for the current/voltage controller 40 based on the alternating current command $I_1$ and the primary angular frequency ω1*. The current/voltage controller 40 receives the current command i* and the motor current i, and generates standard signal Eu*, Ev*, Ew* to obtain the motor torque τM.

The PWM signal generator 42 generates a PWM signal by comparing the standard signal (Eu*, Ev*, Ew*) with a triangular wave, and forms gate signals for six power elements composing arms of the PWM inverter 13, based on the PWM signal, in a conventional manner.

The battery current/voltage controller 44 controls the currents and the voltages of the energy battery 1 and the power battery 2 so as to maintain these parameters within a given range based on the output of the battery/voltage detectors 4, 5. When the current and the voltage exceed the allowable value, the battery current/voltage controller 44 controls either the relay 6, the energy battery control switch 7 or the main contactor 12 to an OFF-state, so as to bring these variables into the allowable range. The details of the control will be described later.

Figure 2:
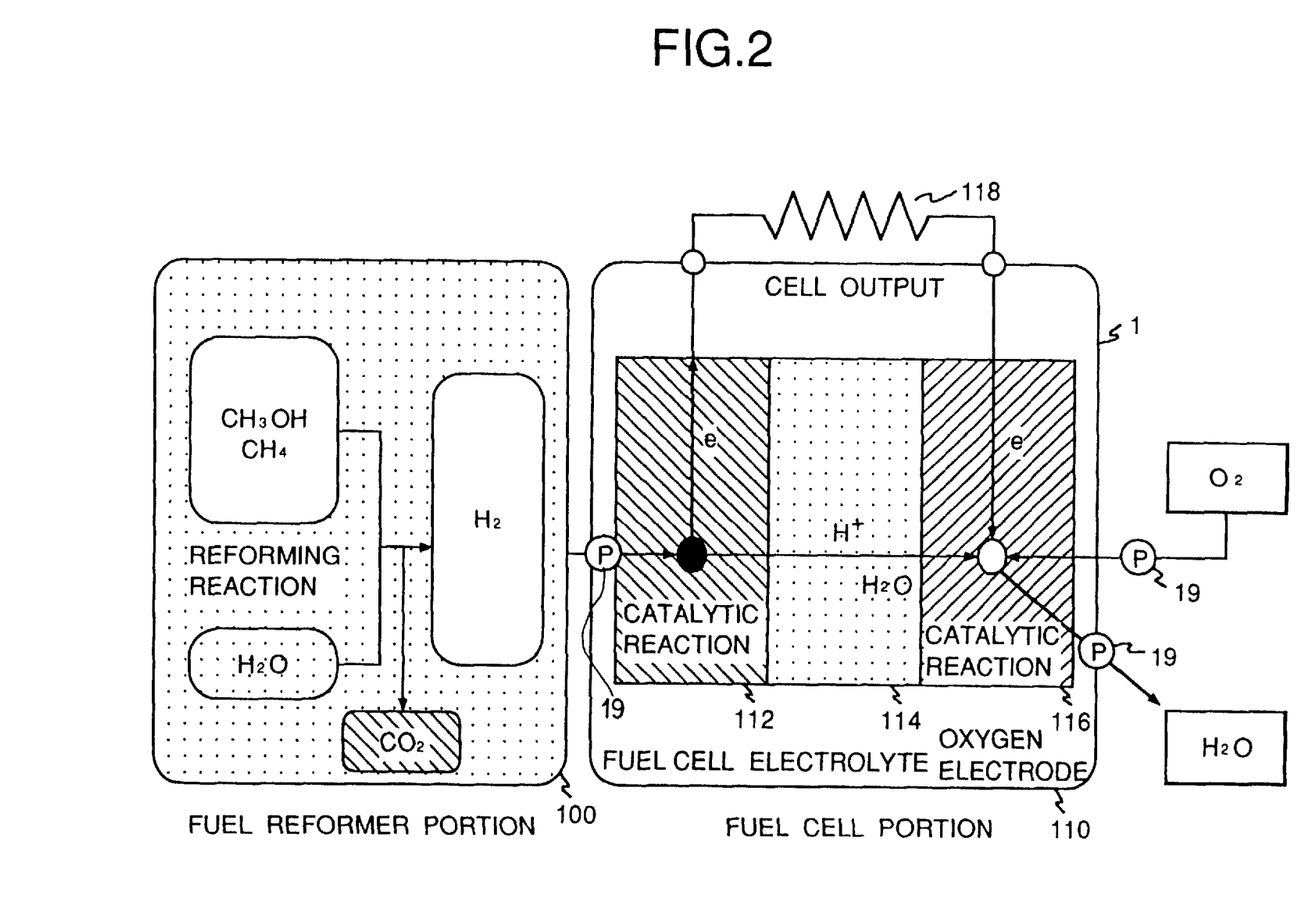
FIG. 2 shows the construction of an example of the energy battery in FIG. 1.

FIG. 2 shows an example of the energy battery 1, which is composed of a fuel reformer 100 and a fuel cell 110. In the fuel reformer 100, $H_2$ gas is generated by reforming reaction of methanol $CH_3OH$ and/or methane $CH_4$ and water $H_2O$. The fuel cell 110 has a fuel electrode 112, an electrolyte 114, an oxygen electrode 116 and an output portion 118. It outputs power of approximately 1 W/cm² per cell to the output portion 118 through a catalytic reaction, using raw materials of $H_2$ gas and $O_2$ gas supplied by pumps 19. The water ($H_2O$) produced as a result of the reaction is extracted by a pump 19.

In the energy battery 1, a constant cell output power can be always obtained at the output portion 118 as long as the raw materials are supplied. The pump 19 is driven under a given condition even when the key switch 15 is OFF. The details will be described later. The pump 19 also recirculates cooling water (not shown).

Figure 3:
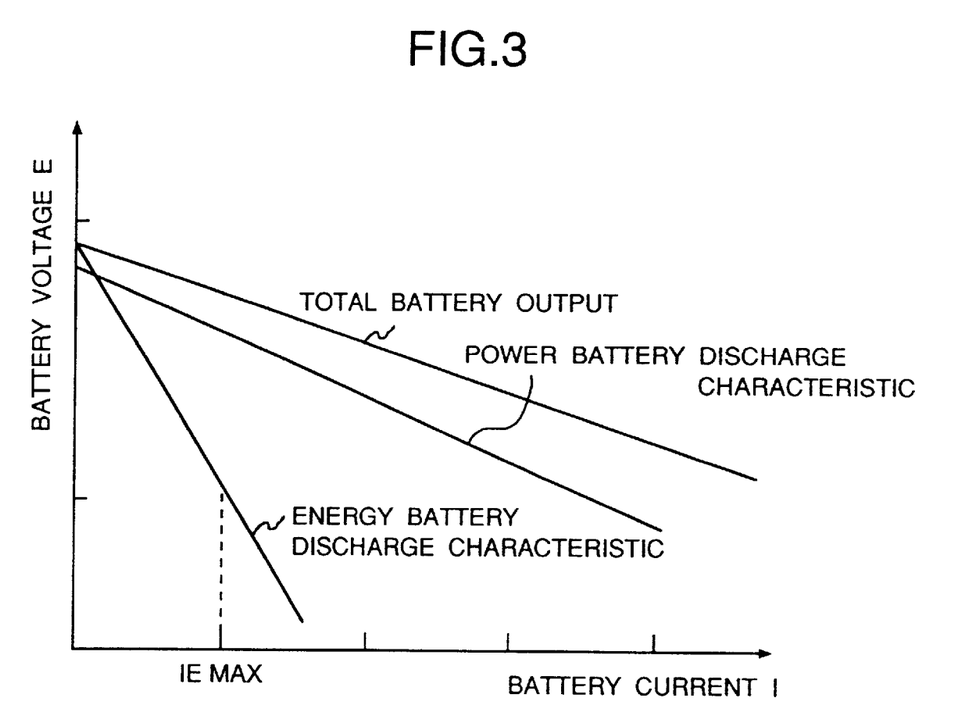
FIG. 3 is a graph showing the characteristic of batteries composing a main electric power source.

FIG. 3 is a graph showing the characteristic of batteries 1, 2 of the main electric power source. The power battery 2 can generate a high voltage in the range of a large current compared to the energy battery 1. However, the voltage of the energy battery 1 at no-load condition is set higher than the voltage of the power battery 2. Therefore, when the electric vehicle is driven in a low load condition, the electric power required for operating the motor 14 is mainly supplied from the energy battery 1. When the load of the electric vehicle is increased and a larger power is required, electric power is supplied to the motor 14 mainly from the power battery 2.

The discharge current of the energy battery 1 is controlled by the energy battery control switch 7 so as to be less than a maximum value $I_{EMAX}$.

When the power battery 2 is in a discharge state, is charged by the energy battery 1 by closing the energy battery control switch 7 and opening the main contactor 12, so as to supply electric power from the energy battery 1 to the power battery 2. At that time, the current of the energy battery 1 detected by the battery current/voltage detector is controlled by the energy battery control switch 7 so as to be less than the value $I_{EMAX}$. When the charge rate of the power battery reaches a given value (commonly, within the range of 90 to 100 percent of full charge), the energy battery control switch 7 is turned OFF to stop charging. After completion of charging the power battery 2, the relay 6 is turned OFF. Thus, the current flowing out from the energy battery 1 is kept below $I_{EMAX}$. Charging of the power battery 2 may be performed during a period when the electric vehicle does not require power.

Figure 4:
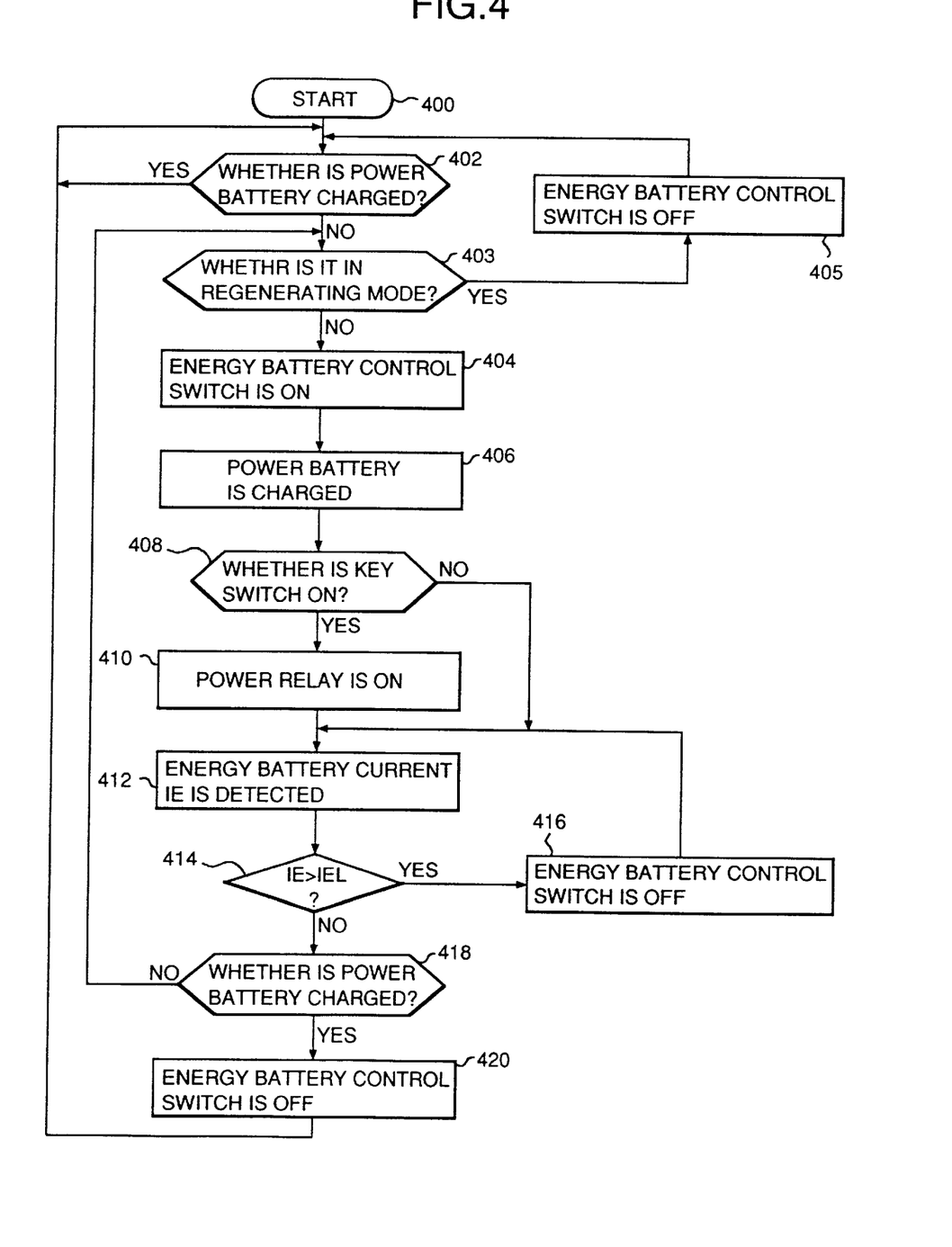
FIG. 4 is a flow diagram showing the operation of the battery current/voltage control unit in FIG. 1.

Operation of the battery current/voltage controller 44 in the controller 10 is shown in the flow diagram of FIG. 4. Initially, it is determined in step 402 whether the charge voltage of the power battery 2 (detected by the power battery current/voltage detector 5 with the key switch 15 OFF) is above a given charge voltage. If so, the following control is unnecessary, and processing returns of the start. If the voltage of the power battery 2 is below the given charge voltage, a determination is made in step 403 whether the power battery is in a regenerative mode to perform recovery control in the next step. If not, the energy battery control switch 7 is turned to a conduction state to charge the power battery 2 (Steps 404, 406). If the power battery 2 is in the regenerative mode in step 403, the energy battery control switch 7 is turned OFF in step 405 to stop charging to the power battery 2 in order to improve regenerative efficiency.

Next, when the key switch 15 is turned ON, the relay 6 and the main contactor 12 are turned to conduction states to supply electric power to the motor 14 from the energy battery 1 and the power battery 2 (Steps 408 to 410). At the same time, the current $I_E$ flowing out from the energy battery, detected by the battery current/voltage detector 4, is regulated to be less than a given value (steps 412–416) by performing ON/OFF control of the energy battery control switch 7. That is, when the energy battery 1 is in a discharge state and its voltage is low, the energy battery control switch 7 is turned off, so that electric power is supplied to the motor 14 only from the power battery 2.

The charge/discharge state of the power battery 2 is detected by the battery current/voltage detector 5. When the charge voltage of the power battery 2 exceeds a given charge voltage, the energy battery control switch 7 is opened to stop charging from the energy battery 1 (Steps 418 to 420). Thus, by the same process, the currents and the voltages of the energy battery 1 and the power battery 2 are maintained within the given ranges.

As described above, when the charge level of the power battery 2 is less than the given value, the power of the energy battery 1 is generated by driving the pump 19, even if the key switch 15 is in OFF-state, to charge the power battery 2. Charging is stopped when the charge level of the power battery 2 reaches to the given value.

When an abnormal state such as over-heat or need of fuel supply occurs in the energy battery 1, the relay 6 is turned off.

Figure 5:
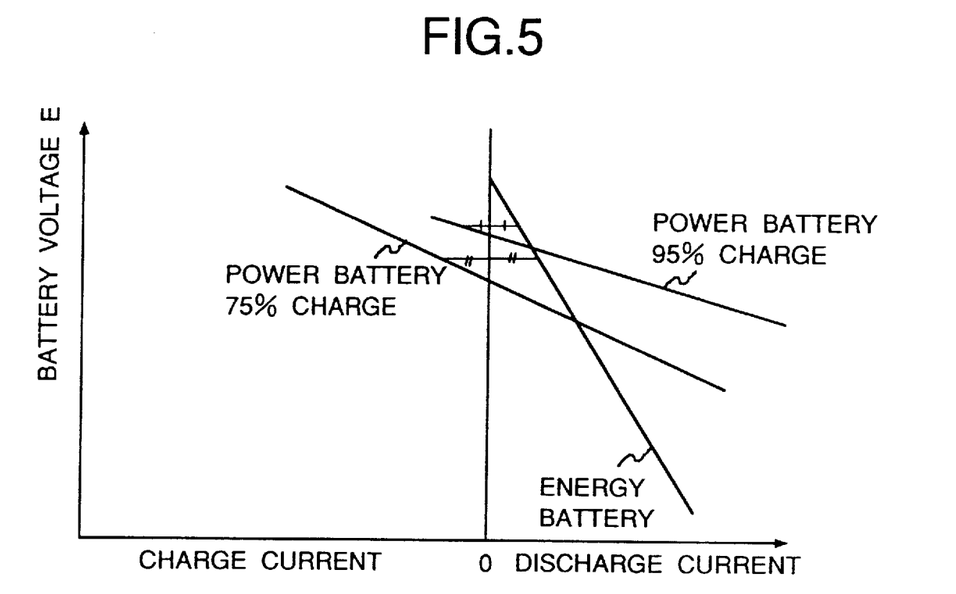
FIG. 5 is a graph showing the charge/discharge characteristics of a power battery and an energy battery.

FIG. 5 is a graph showing the charge/discharge characteristics of the power battery 2 and the energy battery 1. When the power battery 2 is at 75% of full charge, current iA flows from the energy battery 1 to the power battery 2 since the voltage of the energy battery 1 is higher than the voltage of the power battery 2. When the discharge current becomes equal to the charge current, the charge current balances with the discharge current.

Figure 6:
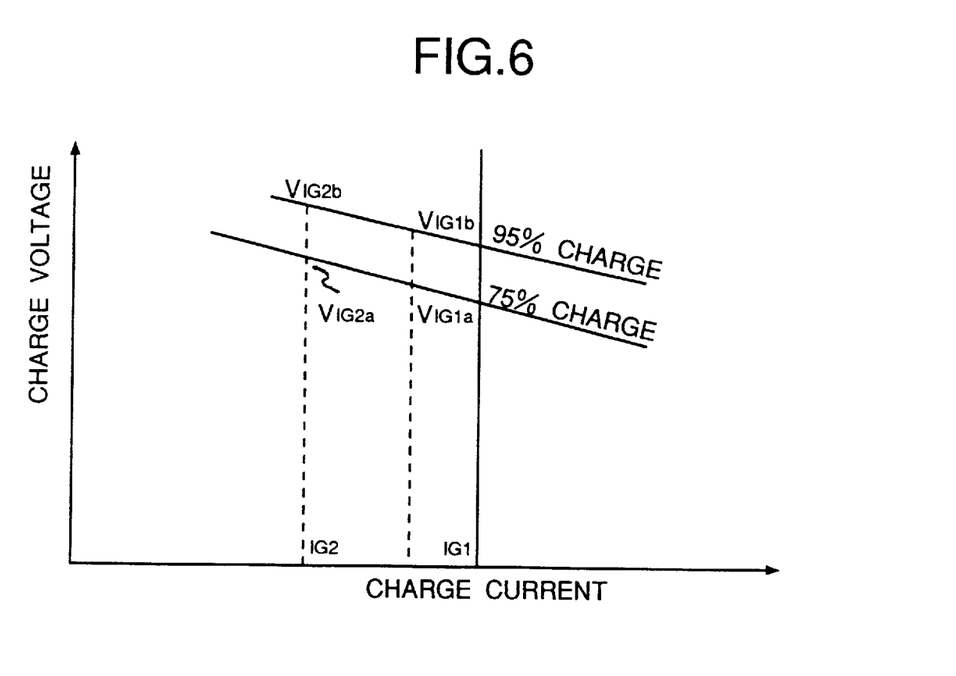
FIG. 6 is a graph showing the detecting method of the charge status of the power battery.

The charge status of the power battery 2 is detected by the battery current/voltage detector 5. FIG. 6 is a graph showing the method of detecting the charge status of the power battery by detecting voltage ViG at a condition where a charge current IG flows to the battery. If the voltage when charge current $IG_1$ flows is $ViG_1a$, the charge is 75% of full charge, and if the voltage is $ViG_1b$, the charge is 90% of full charge. Similarly, if the voltage when charge current $IG_2$ flows is $ViG_2a$, the charge is 75% of full charge, and if the voltage is $ViG_2b$, the charge is 90% of full charge. As an example of charge control of the power battery, it is preferable that charging is started when charge is less than 75% of full charge, and charging is stopped when the charge reaches 95% of full charge.

As for the motor for driving an electric vehicle in the present invention, a dc motor may be used instead of the ac motor. Further, means other than an inverter may be used for converting a direct current electric power source to a variable voltage, variable frequency ac power source.

For maintaining the currents and the voltages of the energy battery 1 and the power battery 2 within the given ranges, it is also possible for the battery current/voltage control unit 44 to perform such control by calculating necessary information from the current or voltage of any one of the battery current and the battery voltage detectors 4, 5 and the primary current i in the primary winding of the ac motor 14 instead of using the outputs of the battery current and voltage detectors 4, 5. For since the load condition of the ac motor 14 and the current and voltage conditions of the both batteries 1, 2 can be determined, the same control as above can be performed.

It is also possible to control the flow of regenerative energy to the power battery 2 during regenerative braking of the electric vehicle using the battery current/voltage controller 44.

Figure 1:
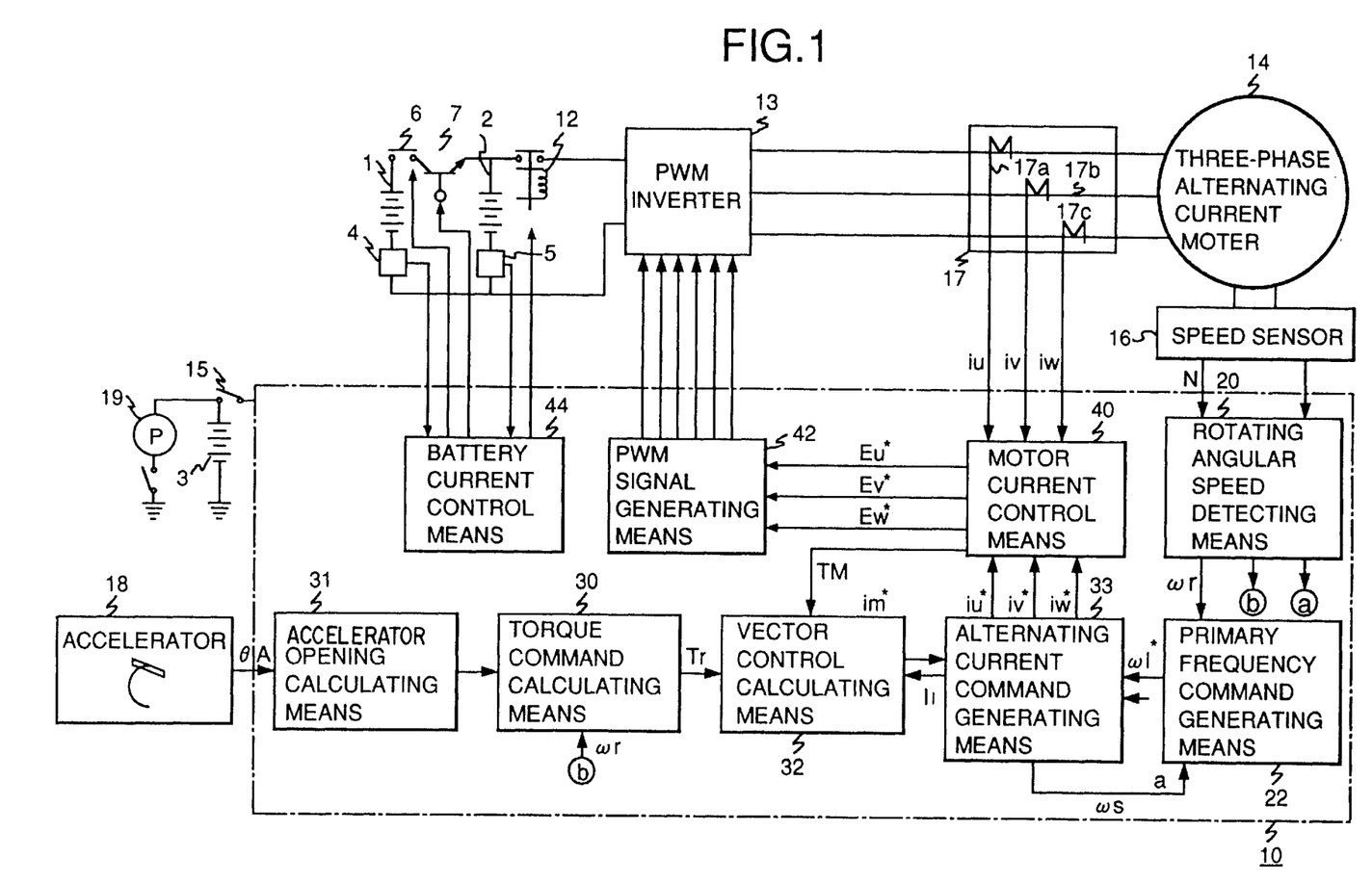
FIG. 1 is a block diagram showing an embodiment of a driving system for an electric vehicle in accordance with the present invention.
Figure 7:
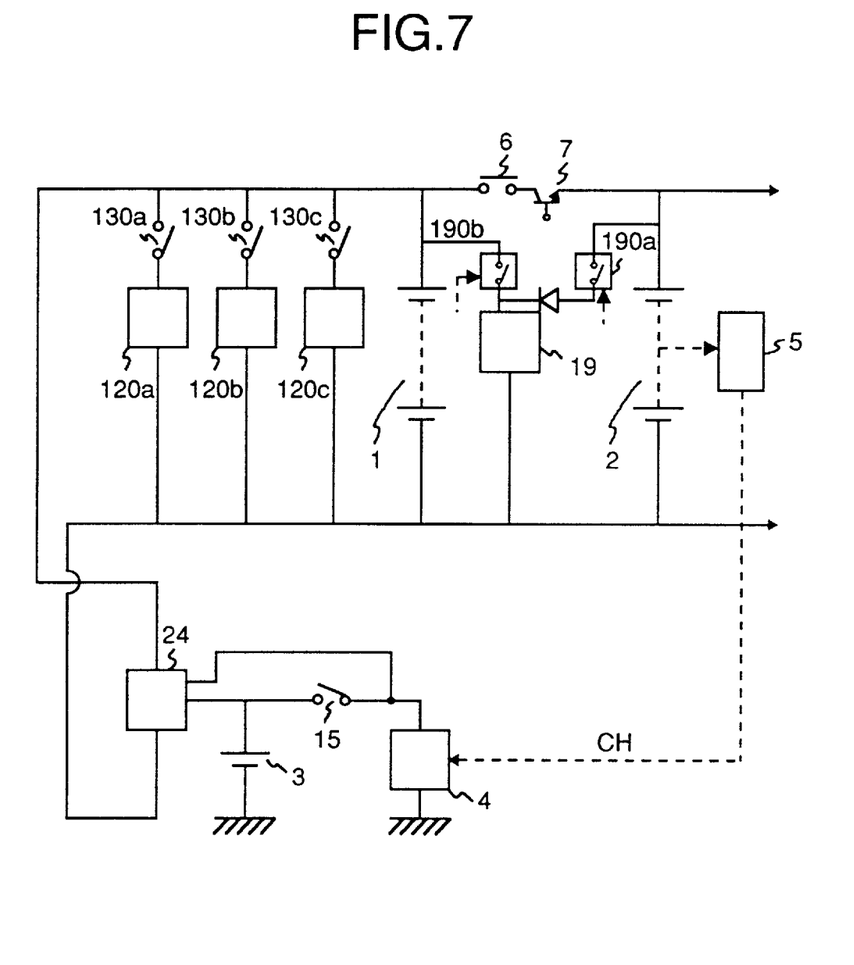
FIG. 7 is a diagram showing another embodiment of a part of a control device of the energy battery of the embodiment in FIG. 1.
Figure 8A:
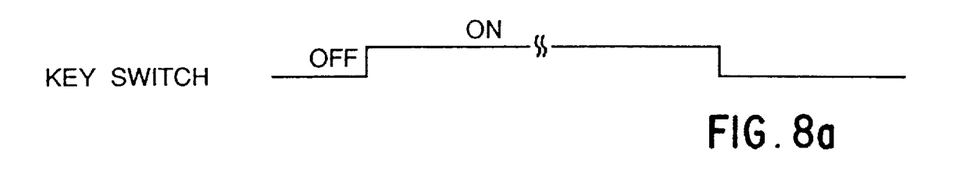
FIG. 8 is a time chart showing the operation of the control device in FIG. 7.
Figure 8B:
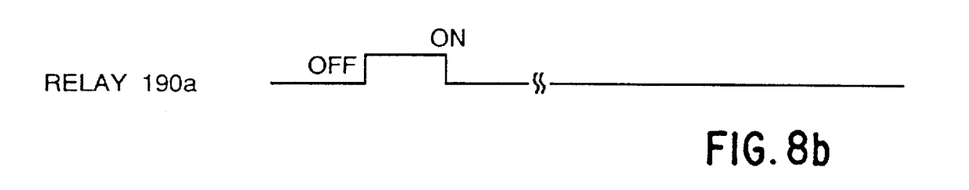
Figure 8C:
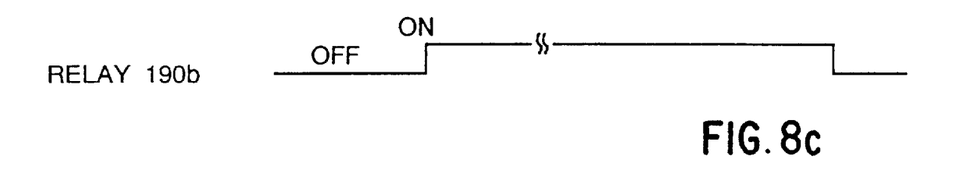
Figure 8D:
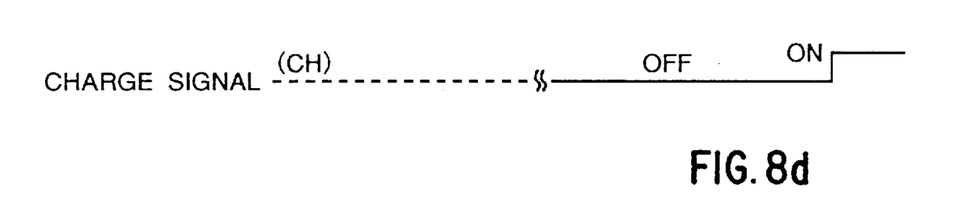

FIG. 7 is a diagram showing another embodiment of a portion of a control device for the energy battery in the hybrid battery of the embodiment in FIG. 1. The reference character 15 is a key switch; the reference character 19 is a motor for energy battery drive pump; and the reference character 24 is a DC-DC converter. Loads 120 are connected to the energy battery, including an air-conditioner motor 120a, a power steering motor 120b and a vacuum motor 120c. The reference characters 130 indicate load relays for the energy battery which include an air-conditioner motor relay 130a, a power steering motor relay 130b and a vacuum motor relay 130c. Further, as motor relays for energy battery drive pump, there are a first relay (RLf1) 190a and a second relay (RLf2) 190b.

In the embodiment of FIG. 7, the drive pump 19 of the energy battery 1 uses the power battery 2 as the electric power source at starting. As shown in FIG. 8, before starting operation, the key switch 15 is OFF and both of the relays 190 for the energy battery drive pump (the first relay 190a, the second relay 190b) are OFF as well. When the key switch 15 is turned ON at a starting operation, the first relay 190a is turned ON to supply electric power to the drive pump 19 from the power battery 2. The energy battery drive pump 19 supplies raw material to the energy battery 1 (the fuel cell) which, as a result, generates output power. Corresponding to this operation, the second relay (RLf2) 190b is turned ON to supply electric power to the motor of the drive pump 19 from the energy battery 1, and at the same time the power battery 2 is charged from the energy battery 1. After the energy battery 1 reaches a state in which it generates sufficient power, the first relay 190a is turned to OFF-state.

As described above, the second relay 190b is self-held after starting of the energy battery 1. Thereafter, the operating state of the energy battery 1 is continued even if the key switch 15 is turned OFF to stop driving of the electric vehicle. The power battery 2 is thus charged from the energy battery 1 until the voltage of the power battery 2 detected by the battery current/voltage detector 5 reaches the given value.

In addition to the relay corresponding to the energy battery 1, the loads of the energy battery 1, for example, the air conditioner motor, the power steering motor and the vacuum motor are connected to the energy battery 1 through the air conditioner motor relay 130a, the power steering motor relay 130b, the vacuum motor relay 130c, respectively, to control individually the starting and stopping of each of the loads.

Electric power from the energy battery 1 is supplied to each of the loads of these auxiliary machines, because the electric power of the power battery 2 is used to propel the vehicle, which results in large load fluctuations, while the electric power of the energy battery 1 capable of generating a constant output power for a long time, and the load fluctuations of the auxiliary machines are comparatively small. In this manner, the maximum travel distance can be extended and the size of the electric power source system can be decreased. Further, it is possible to respond to the output demand of a vehicle in a wide range of load conditions, and the driving characteristics can be improved.

The DC-DC converter 24 changes the auxiliary battery 3 using electric power from the energy battery 1. This charging is controlled by the battery current/voltage controller 44 which monitors the voltage of the auxiliary battery 3 at the same time.

Figure 9:
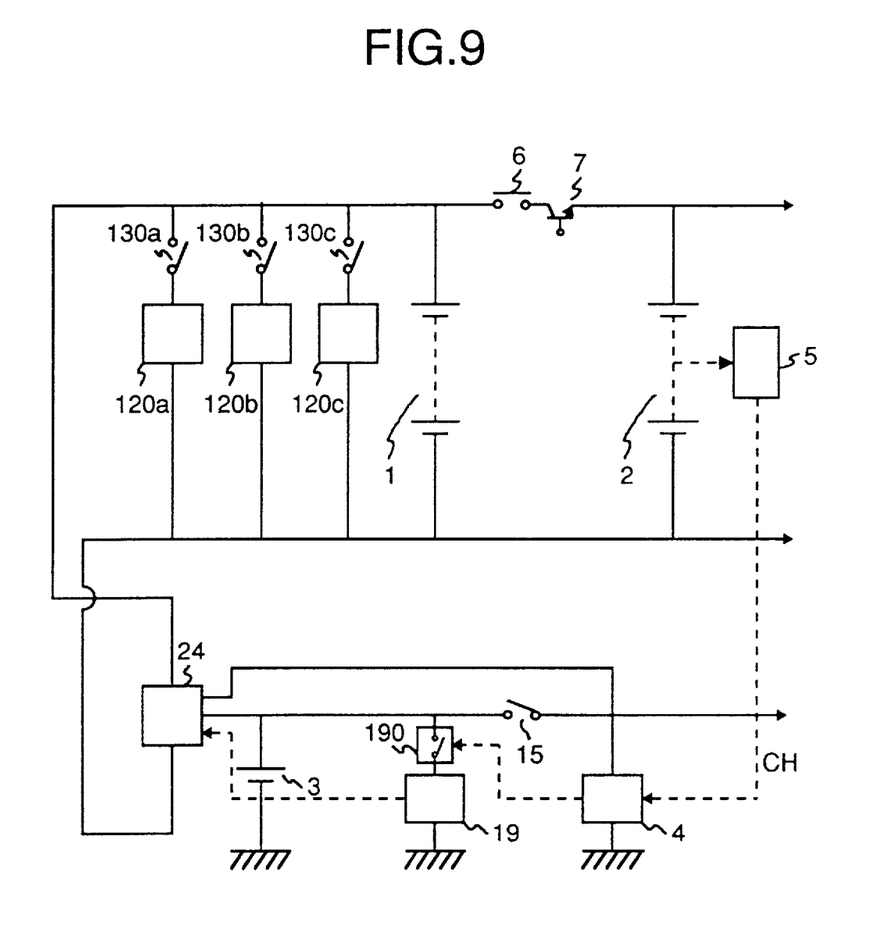
FIG. 9 is a diagram showing a further embodiment of a part of a control device of the energy battery of the embodiment in FIG. 1.
Figure 10A:
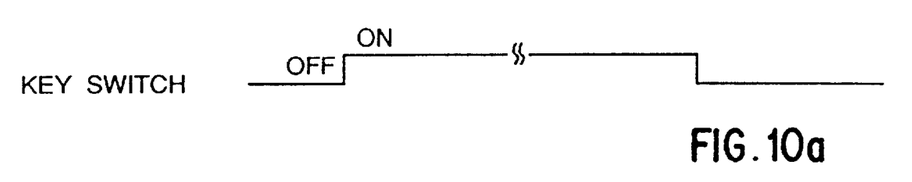
FIG. 10 is a time chart showing the operation of the control device in FIG. 9.
Figure 10B:
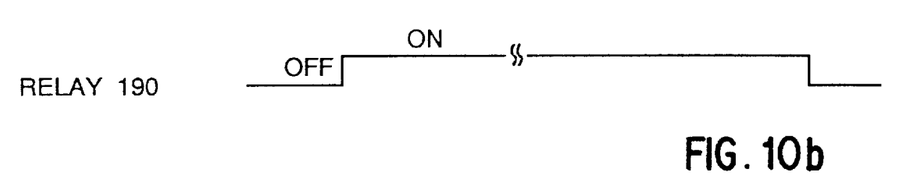
Figure 10C:
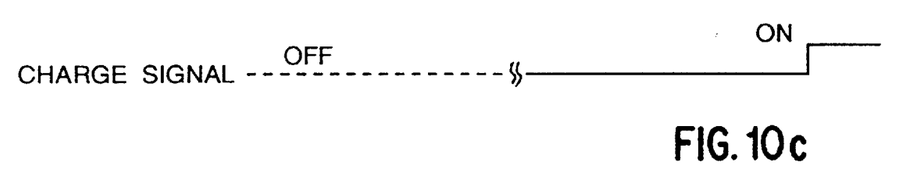
Figure 10D:
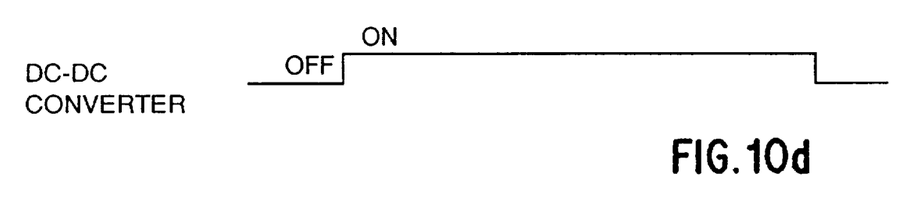

FIG. 9 is a diagram showing a further embodiment of a portion of a control device of the energy battery 1 of the embodiment in FIG. 1. In this embodiment, the drive pump 19 of the energy battery 1 uses the auxiliary battery 3 as an electric power source during starting operation. As shown in FIG. 10, before starting operation, the key switch 15 is OFF and the motor relay 190 for energy battery drive pump is OFF. When the key switch 15 is turned ON at starting, electric power is supplied to the drive pump 19 from the auxiliary battery 3. The drive pump 19 supplies fuel to the energy battery 1 (the fuel cell) which, as a result generates output power, and the power battery 2 is thus charged from the energy battery 1. Thereafter, the operating state of the energy battery 1 is continued even if the key switch 15 is turned OFF to stop driving of the electric vehicle, and the power battery 2 is thus charged from the energy battery 1 until the voltage of the power battery 2 detected by the battery current/voltage detector 5 reaches the given value.

As in FIG. 7 the loads of the energy battery 1 are connected to it through the air-conditioner motor relay 130a, the power steering motor relay 130b, the vacuum motor relay 130c, so that electric power from the energy battery 1 is supplied to these loads. The DC-DC converter 24 charges the auxiliary battery 3 with electric power of the energy battery 1, under control of the battery current/voltage controller 44, which monitors the voltage of the auxiliary battery 3 in the same manner as in the case of the power battery 2. Even if the key switch 15 is turned OFF, charging is continued and is completed by stopping the drive pump when the voltage reaches a given value. In this embodiment, the electric power of the power battery 2 is also used to drive the vehicle, which generates large load fluctuations. Electric power of the energy battery 1, which is capable of generating a constant output power for a long time is used for the auxiliary machines, such as air-conditioner, for which load fluctuations are comparatively small. Further, in this embodiment, the auxiliary battery 3 is used as the electric power source for the energy battery 1 at starting of operation, which is effective in a case where the power consumption of the drive pump 19 is comparatively small.

As described above, according to the present invention, it is possible to drive the electric vehicle for a long time, and to accommodate a wide range of output power demand characteristics by charging the power battery with the electric power supplied from the energy battery, which always generates a constant output power. In particular, the electric power of the power battery is used to drive the vehicle, for which load fluctuations are large; and the electric power of the energy battery, which is capable of obtaining a constant output power for a long time, is used for the auxiliary machines in which load fluctuations are small. In this manner, the maximum possible travel distance can be extended and the size of the electric power system can be decreased. Further, the electric power system can respond to a wide range of output power demands of the vehicle, and the driving characteristics can be improved.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for driving an electric vehicle having a driving motor, a dc electric power source comprising a power battery coupled to said motor by means of an inverter and an energy battery connected in parallel with said power battery by means of an energy battery control switch, a control device including signal generating means for generating a signal to control rotation of the motor, and an ON-OFF key switch for said control device, said apparatus comprising:

a battery current/voltage control unit for controlling said energy battery control switch based on current or voltage of one of said power battery, said energy battery and said motor, and for maintaining a voltage of said dc electric power source within a given range; and charging means for charging said power battery from said energy battery when said key switch is turned off, if a charge level of said power battery is below a given value, and for stopping said charging if said charge level is above a given value;

wherein said energy battery has drive pumps coupled to supply fuel and recirculate water, said drive pumps using said power battery as the electric power source at starting operation.

2. Apparatus for driving an electric vehicle having an inventer for converting electric power from a dc electric power source into a variable voltage, variable frequency ac power output, a three-phase ac motor for driving the vehicle, signal generating means for generating a signal to control said inverter, and a key switch for controlling ON-OFF operation of said motor, said dc electric power comprising a power battery connected to said three-phase ac motor by means of an inverter and an energy battery connected in parallel with said power battery through an energy battery control switch, said apparatus comprising:

a battery current/voltage control unit for controlling said energy battery control switch based on current or voltage of one of said power battery, said energy battery, said three-phase ac motor and said inverter, and for maintaining a voltage of said dc electric power source within a given range; and charging means for charging said power battery from said energy battery when said key switch is turned off, if a charge level of said power battery is below a given value, and for stopping said charging if said charge level is above a given value;

wherein said energy battery has drive pumps coupled to supply fuel and recirculate water, said drive pumps using said power battery as the electric power source at starting operation.

3. Apparatus for driving an electric vehicle having a driving motor, a dc electric power source comprising a power battery coupled to said motor by means of an inverter and an energy battery connected in parallel with said power battery by means of an energy battery control switch, a control device including signal generating means for generating a signal to control rotation of the motor, and an ON-OFF key switch for said control device, said apparatus comprising:

a battery current/voltage control unit for controlling said energy battery control switch based on current or voltage of one of said power battery, said energy battery and said motor, and for maintaining a voltage of said dc electric power source within a given range; and charging means for charging said power battery from said energy battery when said key switch is turned off, if a charge level of said power battery is below a given value, and for stopping said charging if said charge level is above a given value;

wherein said energy battery has drive pumps coupled to supply fuel and recirculate water, said drive pumps using an auxiliary battery as the electric power source at starting operation.

4. Apparatus for driving an electric vehicle having an inventer for converting electric power from a dc electric power source into a variable voltage, variable frequency ac power output, a three-phase ac motor for driving the vehicle, signal generating means for generating a signal to control said inverter, and a key switch for controlling ON-OFF operation of said motor, said dc electric power comprising a power battery connected to said three-phase ac motor by means of an inverter and an energy battery connected in parallel with said power battery through an energy battery control switch, said apparatus comprising:

a battery current/voltage control unit for controlling said energy battery control switch based on current or voltage of one of said power battery, said energy battery, said three-phase ac motor and said inverter, and for maintaining a voltage of said dc electric power source within a given range; and charging means for charging said power battery from said energy battery when said key switch is turned off, if a charge level of said power battery is below a given value, and for stopping said charging if said charge level is above a given value;

wherein said energy battery has drive pumps coupled to supply fuel and recirculate water, said drive pumps using an auxiliary battery as the electric power source at starting operation.

5. Apparatus for driving an electric vehicle having a driving motor, a dc electric power source comprising a power battery coupled to said motor by means of an inverter and an energy battery connected in parallel with said power battery by means of an energy battery control switch, a control device including signal generating means for generating a signal to control rotation of the motor, and an ON-OFF key switch for said control device, said apparatus comprising:

a battery current/voltage control unit for controlling said energy battery control switch based on current or voltage of one of said power battery, said energy battery and said motor, and for maintaining a voltage of said dc electric power source within a given range; and charging means for charging said power battery from said energy battery when said key switch is turned off, if a charge level of said power battery is below a given value, and for stopping said charging if said charge level is above a given value;

wherein the vehicle has auxiliary machines including an air conditioning motor, a power steering motor and a vacuum motor, said auxiliary machines being driven by said energy battery as the electric power source.

6. Method of driving an electric vehicle having a hybrid battery, a motor for driving the vehicle, a dc electric power source, and signal generating means for generating a signal to control rotation of said motor, said dc electric power source comprising a power battery connected to said motor, an energy battery which generates a constant output power connected in parallel with said power battery through an energy battery control switch, and a key switch for controlling ON-FF operation of said batteries, said method comprising the steps of:

said battery current/voltage control means maintaining an output voltage of said dc electric power source within a given range by controlling said energy battery control switch, based on current or voltage of one of said power battery, said energy battery, said three-phase ac motor, and input current of said inventer;

charging said power battery from said energy battery when said key switch is turned off, if the charge level of said power battery is below a given value; and stopping charging when said charge level reaches a given value;

wherein said energy battery has pumps to supply fuel and recirculate water, said pumps being driven using said power battery as an electric power source at starting operation.

7. Method of driving an electric vehicle having a hybrid battery, a motor for driving the vehicle, a dc electric power source, and signal generating means for generating a signal to control rotation of said motor, said dc electric power source comprising a power battery connected to said motor, an energy battery which generates a constant output power connected in parallel with said power battery through an energy battery control switch, and a key switch for controlling ON-FF operation of said batteries, said method comprising the steps of:

said battery current/voltage control means maintaining an output voltage of said dc electric power source within a given range by controlling said energy battery control switch, based on current or voltage of one of said power battery, said energy battery, said three-phase ac motor, and input current of said inventer;

charging said power battery from said energy battery when said key switch is turned off, if the charge level of said power battery is below a given value; and stopping charging when said charge level reaches a given value;

wherein said vehicle has auxiliary machines including an air conditioning motor, a power steering motor and a vacuum motor, the auxiliary machines being driven by said energy battery as the electric power source.

* * * * *